(12) United States Patent
Sane et al.

(10) Patent No.: US 11,354,127 B2
(45) Date of Patent: Jun. 7, 2022

(54) METHOD OF MANAGING MULTI-TIER MEMORY DISPLACEMENT USING SOFTWARE CONTROLLED THRESHOLDS

(71) Applicant: Intel Corporation, Santa Clara, CA (US)

(72) Inventors: Harshad S. Sane, Portland, OR (US); Anup Mohan, Milpitas, CA (US); Kshitij A. Doshi, Tempe, AZ (US); Mark A. Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 101 days.

(21) Appl. No.: 16/927,352

(22) Filed: Jul. 13, 2020

(65) Prior Publication Data

US 2020/0348936 A1    Nov. 5, 2020

(51) Int. Cl.
*G06F 9/30* (2018.01)
*G06F 12/0808* (2016.01)
*G06F 9/38* (2018.01)
*G06F 12/126* (2016.01)
*G06F 12/0888* (2016.01)
*G06F 12/0862* (2016.01)

(52) U.S. Cl.
CPC ........ *G06F 9/30047* (2013.01); *G06F 9/3009* (2013.01); *G06F 9/30043* (2013.01); *G06F 9/3826* (2013.01); *G06F 12/0808* (2013.01); *G06F 12/0862* (2013.01); *G06F 12/0888* (2013.01); *G06F 12/126* (2013.01)

(58) Field of Classification Search
CPC .. G06F 9/3009; G06F 9/3826; G06F 3/30047; G06F 9/30043; G06F 12/0808; G06F 12/0862; G06F 12/0888; G06F 12/126
See application file for complete search history.

(56) References Cited

U.S. PATENT DOCUMENTS

| | | | |
|---|---|---|---|
| 7,865,669 B2 * | 1/2011 | Kornegay | G06F 12/0888 711/138 |
| 10,963,392 B1 * | 3/2021 | Gupta | G06F 12/084 |
| 2017/0177482 A1 * | 6/2017 | Greenspan | G06F 12/0815 |
| 2018/0165214 A1 * | 6/2018 | Farmahini Farahani | G06F 12/0888 |

* cited by examiner

*Primary Examiner* — Aracelis Ruiz
(74) *Attorney, Agent, or Firm* — Jaffery Watson Mendonsa & Hamilton LLP

(57) ABSTRACT

A computing system includes a memory controller having a plurality of bypass parameters set by a software program, a thresholds matrix to store threshold values selectable by the plurality of bypass parameters, and a bypass function to determine whether a first cache line is to be displaced with a second cache line in a first memory or the first cache line remains in the first memory and the second cache line is to be accessed by at least one of a processor core and the cache from a second memory.

24 Claims, 11 Drawing Sheets

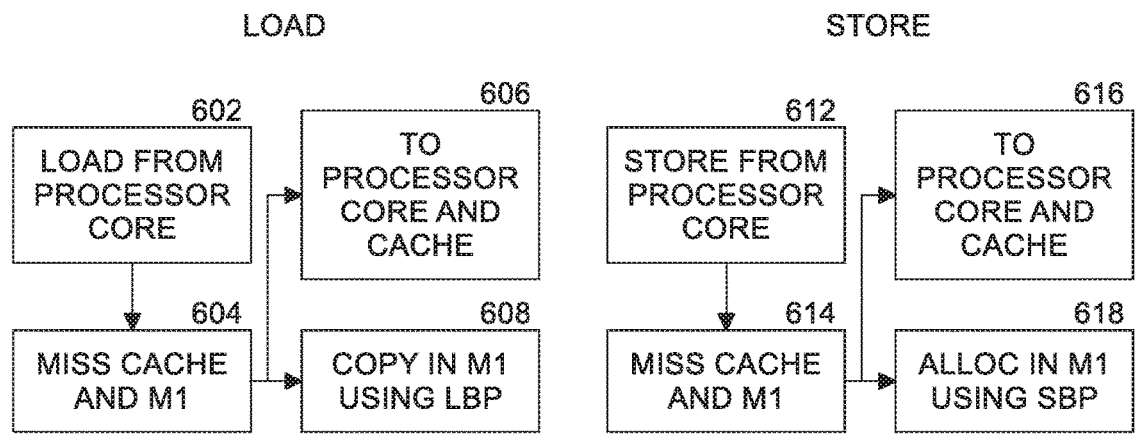
FIG. 6A
FIG. 6B
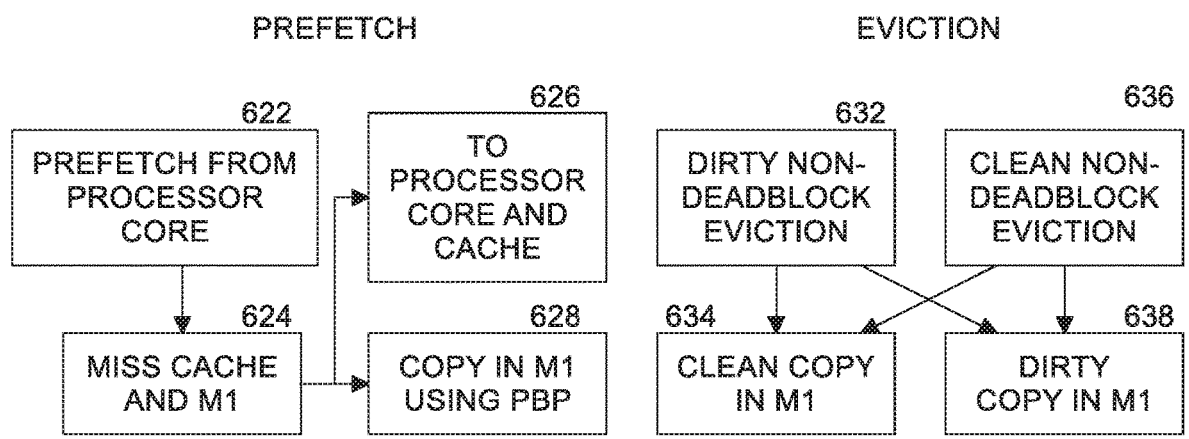
FIG. 6C
FIG. 6D

METHOD OF MANAGING MULTI-TIER MEMORY DISPLACEMENT USING SOFTWARE CONTROLLED THRESHOLDS

BACKGROUND

The field of invention relates generally to managing caching of data in memory devices in computer systems, and, more specifically, to using software-controlled thresholds to dynamically adapt memory side caching behavior in a multi-tier memory system.

Three-dimensional (3D) cross-point memory (3D XPoint) (also called persistent memory (PMEM)) is a byte-addressable, write-in-place non-volatile memory (NVM) technology commercially available from Intel® Corporation as Optane™ and from Micron Corporation as QuantX™ memory, which may be packaged in a persistent memory module, for example, a Data Center Persistent Memory Module (DCPMM) (Optane™ DC Persistent Memory). DCPMM provides persistent memory and volatile memory and, in conjunction with processor technologies, a persistent memory system can support multiple memory modes such as one level memory (1LM), Memory Mode (MM), App-Direct and App-Direct-Write-Back.

Some multilevel memory systems substitute high capacity dual in-line memory modules (DIMMs) (such as DCPMMs) for high performance DIMMs (such as multi-channel dynamic random-access memory (DRAM) (MCDRAM), high bandwidth memory (HBM), etc.) alongside traditional double data rate 4 (DDR4)/DDR5 synchronous DIMMs with DRAM chips. To minimize software complexity and for software portability in such multi-level memory systems (e.g., NVDIMMs and DRAM), it is known to have the option of transparent memory side caching (also known as "cached mode", "2LM mode", or "Memory Mode") so that referenced data from a lower performance memory tier is promoted into a higher performance memory tier at fine granularity by memory controller hardware. In such a "2LM" mode (which may be extended to 3LM or 4LM in the future), the system memory addresses coming from a processor refers to the outermost level of memory (e.g., farthest from the processor), and the memory controller maps and promotes the data transparently into an inner level of memory (e.g., nearest to the processor) with better bandwidth and/or latency.

One problem with transparent caching (for example, as for 2LM) is that from time to time, performance can be unpredictable due to evictions of data from a higher performance memory tier by other data coming in from a lower performance memory tier. Longer latencies and bandwidth pressures in the lower performance memory tier can thus dominate application performance, and in some cases, produce sharp drops in overall performance (the displacements happen to be at the mercy of the physical placements in memory that are not under the control of a software developer). While a similar problem can also arise in processor caches, evictions of frequently used data are rare in processor caches due to a higher degree of set-associativity in processor caches; such is not the case with memory-side caches. Even if some frequently used data does get evicted from a processor-side cache, the latencies to the next caching level in a processor-side cache hierarchy are much smaller than those in a memory-side cache.

In one alternative (e.g., in an application direct (AD) mode) software decides what pages go in which memory tier; but use of the AD mode may be difficult for many applications because: (a) software has to be modified and the right heuristics have to be picked for each software application for each memory configuration, (b) placement is at a page granularity, which means that even one hot cache line can cause a remaining 63 cache lines worth of capacity consumption in the higher performance memory tier and thus considerably reduce performance benefits, unless software is further optimized to keep hot data concentrated in a small number of pages, and (c) even if a single application is carefully optimized for the AD mode, the application can be running with other multi-tenant applications that are not optimized and have an even greater need for higher performance memory tier capacity for any number of reasons. This may result in the use of multi-tiered memory being limited because application developers and cloud service providers would ideally like to use 2LM but also want to have some control over factors that influence a memory controller hardware's promotion of data from a lower performance memory tier to a higher performance memory tier but without having to complicate software.

BRIEF DESCRIPTION OF THE DRAWINGS

FIGS. 6A, 6B, 6C, and 6D are diagrams of load, store, pre-fetch, and eviction scenarios according to some embodiments.

DETAILED DESCRIPTION

Embodiments of the present invention provide the benefits of software simplicity that are possible with hardware-based caching (e.g., 2LM), but allow software to prioritize on an application by application basis, and on a dynamic basis, whether or not accesses by a software thread should be given caching benefits in a higher performance memory tier. In this way embodiments of the present invention emulate AD behavior without changing software and do so based on dynamic information and/or "lightweight" direction from software (by setting certain thresholds), and at the finer, cache line granularity. Further, embodiments do not cause lingering negative performance effects from errors, unlike the prospect for AD when the memory controller pre-commits higher performance memory tier capacity to items of data that in actuality turn out not to be frequently accessed.

Embodiments of the present invention create a software tunable multi-tier memory-mode that dynamically decides how to handle higher performance memory evictions and misses without requiring intrusive software changes. Instead, software may set a plurality of thresholds (with suitable defaults supplied by platform firmware or runtime software) and through them, guide a conditional displacement policy implemented autonomously in memory controller hardware to adapt to observed recent eviction rates in higher performance memory. Recent memory caching behaviors are tracked by the memory controller hardware at a fine time increment, and the above-mentioned thresholds are used by the memory controller to determine how subsequent memory transactions are to be treated. This adapts higher performance memory caching behavior dynamically to align with a current memory context's importance (e.g., processor priority), behavior, and software guidance. Described for 2LM, the present approach can be extended to more than two memory tiers.

Embodiments of the present invention scale easily as the approach is agnostic of memory technology and organization. The approach is somewhat similar in simplicity to associating processor scheduling priorities to threads at run time, which is a very small burden on application developers or to those who deploy applications. Embodiments remove the software development friction, execution profiling efforts, etc., which slow down adoption of new memory devices and new processor designs that work with the memory devices. Embodiments are adaptive in the computing system environment, and therefore simpler to deploy, independent of how many levels of software abstraction (e.g., virtualization, containers, etc.) are introduced. Embodiments work in single tier or multi-tiered configurations without any need to be made conditional upon different configurations.

Figure 1:
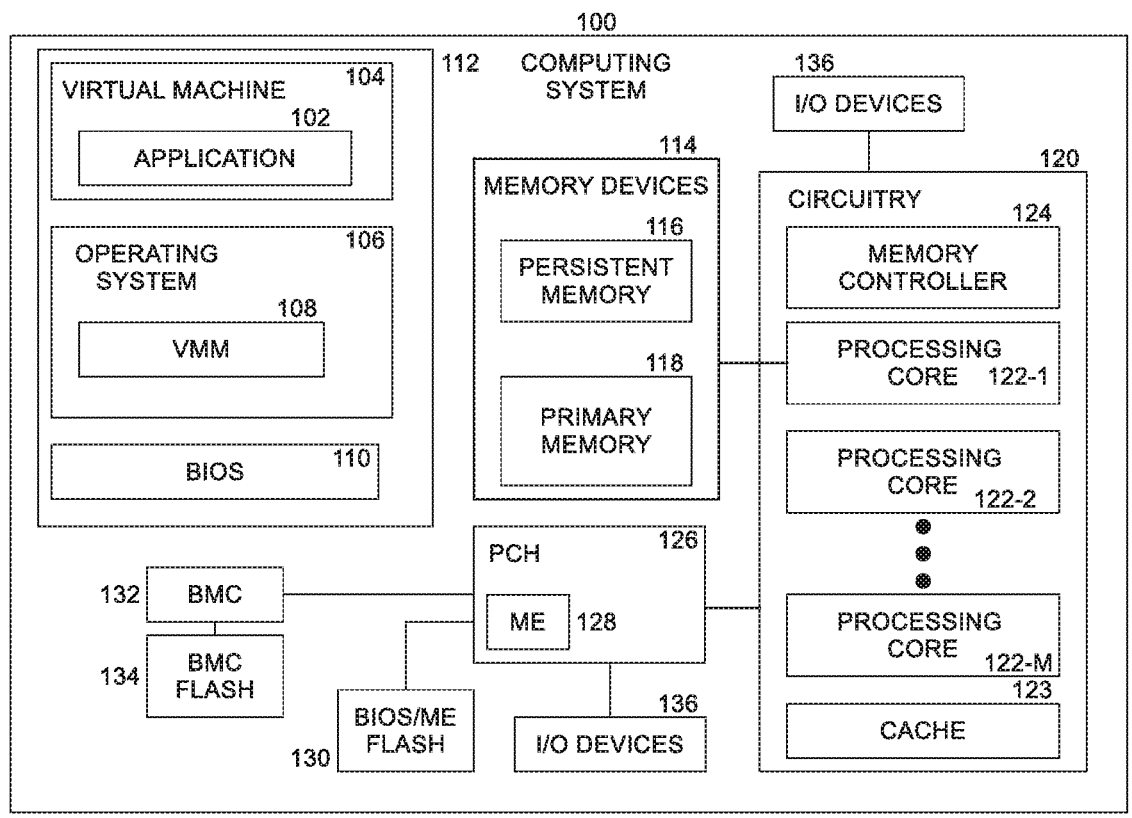
FIG. 1 illustrates an example computing system according to some embodiments.

FIG. 1 illustrates an example computing system 100. According to some examples, computing system 100 includes circuitry 120, memory devices 114 including one or more higher performance capability memory devices such as primary memory devices 118 and one or more lower performance capability memory devices such as persistent memory devices 116 (e.g., DCPMMs) coupled to circuitry 120, and a platform control hub (PCH) 126. PCH 126 includes management engine (ME) 128 (such as ME-SPS) and is coupled to BMC 132 (which in turn is coupled to BMC flash memory 134), BIOS/ME flash memory 130, and one or more I/O devices 136. In some embodiments, I/O devices 136 are coupled to circuitry 120 and these I/O devices may read data from and write data to memory devices 114 without using PCH 126.

Computing system 100 includes software being executed such as operating system (OS) 106, virtual machine manager (VMM) (also known as a hypervisor) 108, at least one application 102 (running in a virtual machine (VM) 104 in one embodiment). In one embodiment, OS 106 is any variant of Linux™. In another embodiment, OS 106 is Windows® Server. Other OSs may also be used (e.g., Apache hypertext transport protocol (HTTP) server available from the Apache Software Foundation, etc.). OS 106 interacts with BIOS 110.

In at least one embodiment, I/O devices 136 may be one or more of hard disk drives (HDDs) and/or solid-state drives (SSDs). In an embodiment, I/O devices 136 include non-volatile memories (NVMs). In some examples, circuitry 120 may communicatively couple to other system components via a PCIe bus (not shown) conforming to version 3.0 or other versions of the PCIe standard published by the PCI Special Interest Group (PCI-SIG). In some examples, OS 106, VMM 108, VM 104, and application 102 are implemented, at least in part, via cooperation between one or more memory devices 114 (including persistent memory 116 and/or primary memory 118), I/O devices 136 (whether coupled to PCH 126 or circuitry 120), and elements of circuitry 120 such as memory controller 124 and processing cores 122-1 to 122-$m$, where "m" is any positive whole integer greater than 2. In an embodiment, OS 106, VMM 108, VM 104 and application 102 are executed by one or more processing cores 122-1 to 122-$m$.

In some examples, computing system 100, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing system 100 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having memory controller 124 and processing cores 122-1 to 122-$m$ may include various commercially available processors, including without limitation, Intel® Atom®, Celeron®, Core (2) Duo®, Core i3, Core i5, Core i7, Itanium®, Pentium®, Xeon® or Xeon Phi® processors, ARM processors, processors from Applied Micro Devices (AMD) Incorporated, and similar processors. In one embodiment, circuitry 120 includes only one processing core.

According to some examples, primary memory 118 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

In an embodiment, persistent memory 116 is a non-volatile memory (NVM). Non-volatile types of memory may include byte or block addressable types of non-volatile memory having a 3D)(Point memory structure that includes chalcogenide phase change material (e.g., chalcogenide glass). Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above.

As used herein, primary memory 118 is referred to as a higher performance capability memory tier M1 (which may also be referred to as being "nearer" to the processor (meaning access to the memory is faster and/or shorter) and/or "higher" in the memory tiers of computing system 100) and persistent memory 116 is referred to as a lower performance memory tier M2 (which may also be referred to as being "farther" from the processor (meaning access to the memory is slower and/or longer) and/or lower in the memory tiers of computing system 100). Other types of memory may also be used as M1 and M2.

Figure 2:
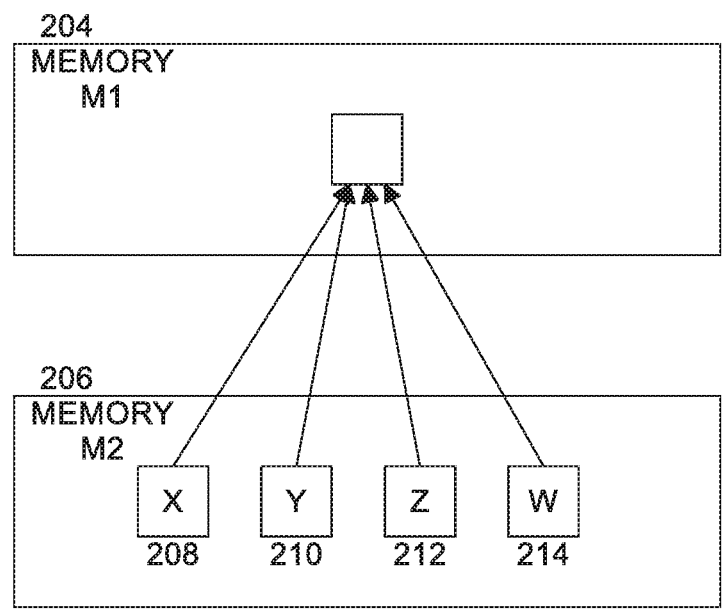
FIG. 2 is a diagram of two memory tiers according to some embodiments.

FIG. 2 is a diagram 200 of two memory tiers according to some embodiments. Memory M1 204 is a higher performance memory (such as primary memory 118 (e.g., DRAM)). Memory M2 206 is a lower performance memory (such as persistent memory 116 (e.g., 3DXP memory)). For any given memory location 205 in M1 204, memory controller 124 determines a mapping of one of the memory locations in M2 206 to memory location 205 in M1 204. For example, cache line address X 208 in M2 206 could be mapped to memory location 205 in M1 204, cache line address Y 210 in M2 206 could be mapped to memory location 205 in M1 204, cache line address Z 212 in M2 206 could be mapped to memory location 205 in M1 204, or cache line address W 214 in M2 206 could be mapped to memory location 205 in M1 204, and so on. This concept is represented as equation 202 where M1(X)=M1(Y)=(M1(Z)= M1(W). As used herein, X is the cache line address in M2 206 that is the physical address for which a processor core 122 issues a load/store memory access request. Although two tiers are shown in FIG. 2, embodiments of the present invention may be expanded to more than two tiers, and there may be any number of memory devices in each tier.

Figure 3:
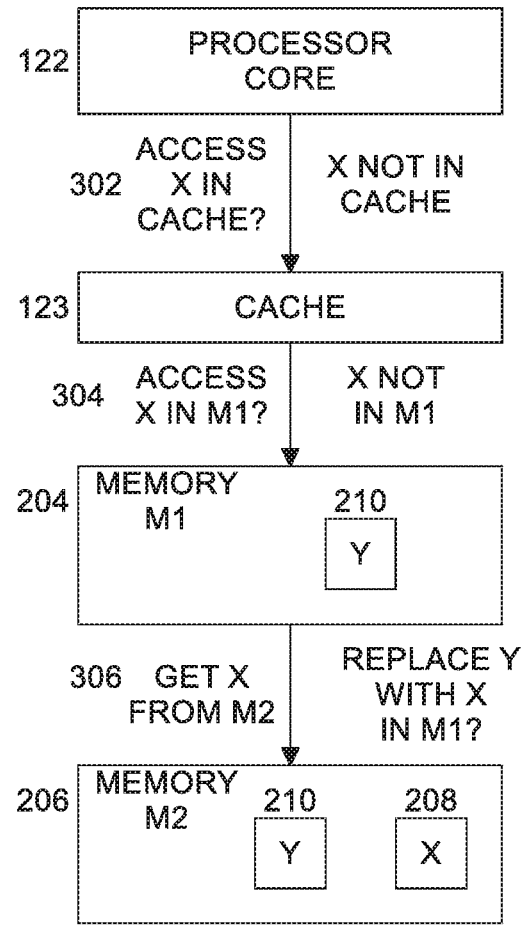
FIG. 3 is a diagram of interactions between a processor core, a cache, a higher performance memory and a lower performance memory according to some embodiments.

FIG. 3 is a diagram 300 of interactions between processor core 122, cache 123, memory M1 204 and memory M2 206 according to some embodiments. Processor core 122 requests a memory access (such as a load, store, prefetch, etc.) that originates at a system physical address, and that system physical address X is either currently cached inside a processor cache (such as L1, L2, . . . etc.), or not present in a processor cache and in that case must be sought from a memory tier. In the case that the address X is not currently cached in the processor-cache, and is also not currently cached in an upper memory tier, then it must be sought from the lower performance memory which holds all of the system memory addresses. On every access for some system memory address X in M2, the memory controller is first looking to satisfy that X is cached in processor-caches, and then if X is not found there, go to memory M1 before going to memory M2. When the memory controller is looking for X in memory M1, the memory controller will generate an address that is a mathematical hash function of the actual system memory address X, and this address, which is called M1(X) herein, is what the memory controller is using, when the memory controller looks for X in memory M1. That is the difference between the actual physical address X in M2 and its berth address M1(X), if cache line X should happen to be in M1. It's possible that data for X is not found in M1 (at the address M1(X)), that is, M1(X) at that time can be holding data from a different address Y in M2, where M1(X) is the same as M1(Y). The memory controller figures this out by looking at a tag for the address M1(X) which the memory controller keeps in a different array, and uses to figure out which of X from M2 or Y from M2 (or Z or W, from M2) is currently sitting at M1(X).

If the data for the memory addressed being accessed is in cache 123, then the request is performed. When the memory access is not satisfiable from the cache, a cache miss occurs. Memory controller next tries to find the data from caching location M1(X) in higher performance memory M1 204. When is not also found to be in M1, a miss occurs. Embodiments of the present invention handle the case when the memory access produces a miss in cache 123 at action 302 and further misses in higher performance memory M1 204 at action 304.

In embodiments of the present this invention, M1(X) designates an address inside higher performance memory M1 to which a hash function in memory controller 124 maps cache line X 208 from lower performance memory M2 206. Let Y 210 be a cache line from lower performance memory M2 206, where Y 210 is not X 208, that is currently in M1 204 at location M1(X) (which is the same as M1(Y) inside M1. For a set associativity of 1 (that is, a direct-map configuration) there is exactly 1 such cache line Y; but in general, for higher set associativity, there may be more such lines. In either case, embodiments handle these situations in a straight-forward manner. A decision to be made in performing the memory access request in embodiments is to determine whether Y (which is currently cached in M1 at the address M1(Y) (which is the same as M1(X)) 210 is to be displaced with X 208 in M1 204.

Embodiments of the present invention use two approximately computed moving window rates. The first rate is the total evictions rate and the second is the dirty eviction rate. Each rate is "short-term" in that the rate is determined over a pre-determined time period (for example, 5 μs). As used herein "approximately computed" means selected hardware counters in memory controller 124 are incremented without locks and averaged over a small-time window (for example, 5 μs) to compute them approximately and in hardware. The rates may be obtained by sampling, or by counting and summing without using synchronization, and using approximate moving window computations. The total evictions rate tracks the rate at which cache lines (such as Y 210) are displaced from higher performance memory M1 204 (e.g., the approximate number of cache lines displaced from M1 for new allocations in the last micro-interval). The dirty eviction rate tracks the portion of the total evictions rate that requires the displaced cache line to be written back into lower performance memory M2 206 (e.g., the approximate number of cache lines displaced from M1 that were in a modified (dirty) state).

Embodiments employ a plurality of threshold parameters. In one embodiment, the threshold parameters are arranged as a threshold matrix. These threshold parameters are used, in conjunction with the total evictions rate and the dirty eviction rate, and according to a plurality of bypass parameters 408 chosen by software, to decide whether or not to displace Y 210 from M1 204 in order to make room for X 208. Not displacing Y with X in M1 is also called "bypassing M1" when the cache line X is sent from lower performance memory 206 M2 directly to processor core 122 (and to cache 123) during a load, store or pre-fetch access.

In some embodiments, the bypass parameters comprise at least three parameters: a load bypass parameter (LBP) 502, a store bypass parameter (SBP) 504, and a pre-fetch bypass parameter (PBP) 506. In embodiments, the threshold parameters are applied when making the bypass determination based at least in part on the settings of the bypass parameters. In some embodiments, each bypass parameter is a natural number. In an embodiment, the number of values that a bypass parameter can take is limited (for example, to 4, 8, 10, 12, 16, and so on). Software or firmware (such as application 102, OS 106, or BIOS 110) sets the bypass parameters at any time as desired to tune the performance of memory caching in computing system 100. In an embodiment, the set of bypass parameters are set for each software thread executing in computing system 100. In some embodiments, the bypass parameters are set by application code 102, a runtime utility in OS 106 that may do so in-band through an interrupt handler, or out-of-band through a/proc interface.

Figure 4:
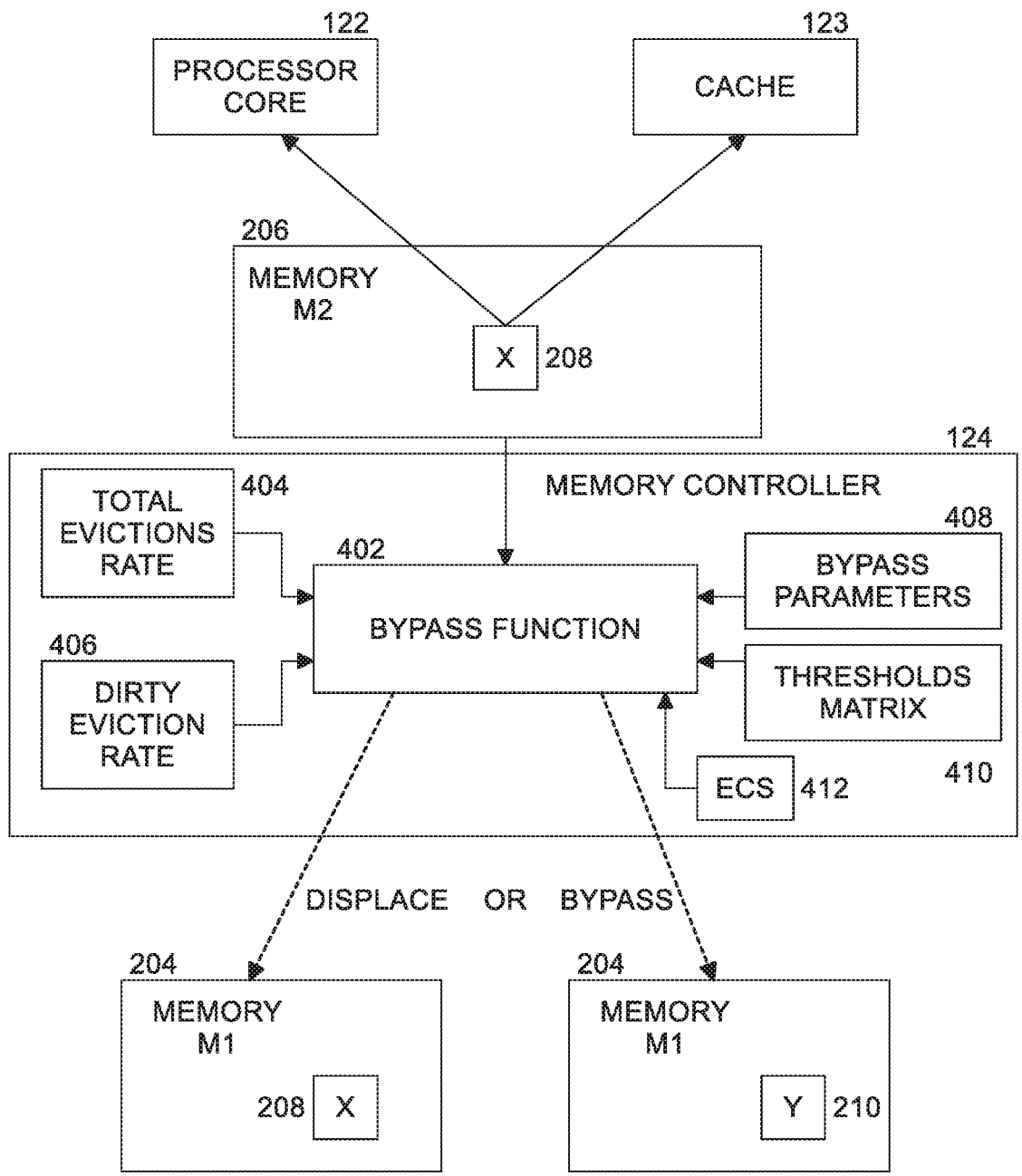
FIG. 4 is a diagram of a bypass function that decides whether a cache line displacement bypasses higher performance memory.

FIG. 4 is a diagram 400 of a bypass function 402 that decides whether a cache line X displacement bypasses higher performance memory M1 204. Bypass function 402 uses total evictions rate 404, dirty eviction rate 406, bypass parameters 408, thresholds matrix 410, and eviction candidate state (ECS) 412 to make a bypass decision whether to bypass the displacement of cache line Y 210 in M1 204 with cache line X 208. When the bypass decision is yes, cache line Y 210 remains in M1 204 (as shown in memory M1 204 on the right side of FIG. 4) and cache line X 208 in memory M2 206 is accessed by processor core 122 and/or cache 123. When the bypass decision is no, cache line Y 210 is displaced in M1 204 by cache line X 208 (as shown in memory M1 204 on the left side in FIG. 4). In an embodiment, bypass function 402 is implemented in circuitry in memory controller 124. In an embodiment, bypass parameters 408 are set by software running in processor core 122. In an embodiment, ECS 412 is a bit signifying whether the current eviction candidate (e.g., cache line Y 210) is dirty (modified) or clean (unmodified). In one embodiment, an ECS of 1 indicates dirty and an ECS of 0 indicates clean.

Figure 5:
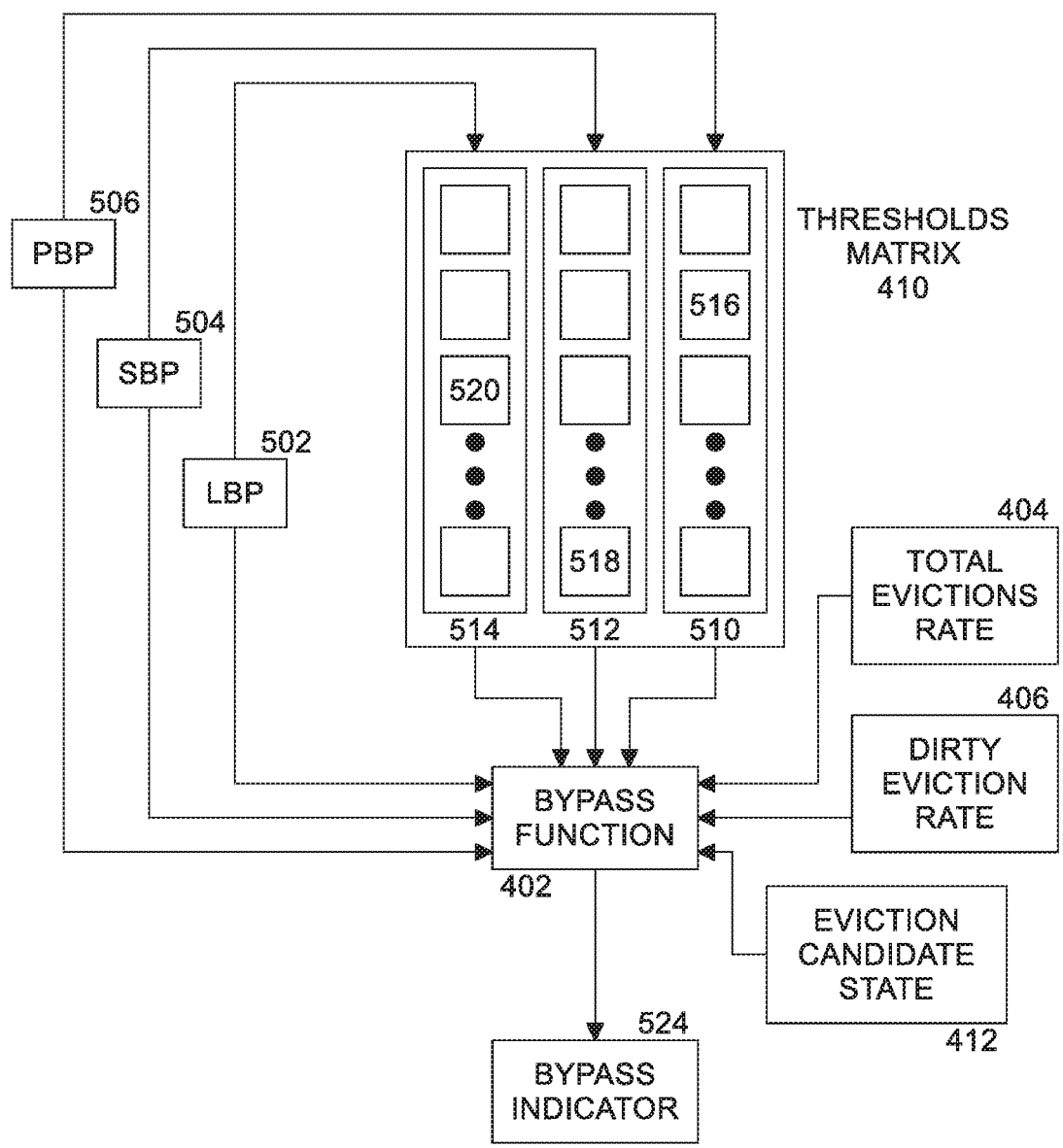
FIG. 5 is a diagram of a thresholds matrix used by the bypass function according to some embodiments.

FIG. 5 is a diagram of thresholds matrix 410 used by bypass function 402 according to some embodiments. Thresholds matrix 410 includes a two-dimensional array of threshold values. Thresholds matrix 410 includes a plurality of columns of threshold values, each column corresponding to a selected bypass parameter. For example, when there are three bypass parameters LBP 502, SBP 504, and PBP 506, there are three corresponding columns 514, 512, and 510 in thresholds matrix 410, respectively. In other embodiments there may be more or fewer bypass parameters and corresponding threshold columns. The value of a bypass parameter selects a row of the thresholds matrix. For example, the value of LBP 502 selects a corresponding row in thresholds matrix 410 in the column 514 corresponding to the LBP. The combination of the row and column selects a current LBP threshold value to be used by the bypass function (such as the threshold value in element 520). Similarly, the value of SBP 504 selects a corresponding row in thresholds matrix 410 in the column 512 corresponding to the SBP. The combination of the row and column selects a current SBP threshold value to be used by the bypass function (such as the threshold value in element 518). Similarly, the value of PBP 506 selects a corresponding row in thresholds matrix 410 in the column 510 corresponding to the PBP. The combination of the row and column selects a current PBP threshold value to be used by the bypass function (such as the threshold value in element 516). The number of elements in a column is determined by the number of possible values in a bypass parameter (e.g., 4, 8, 10, 12, 16, and so on).

Thus, bypass function 402 gets a bypass parameter from thresholds matric 410 for use in making a bypass decision depending on which one of the three bypass parameters is being used. For example, when the current memory access request is a load, bypass function 402 selects a value from the element in thresholds matrix 410 selected by the load column 514 and the row selector value in LBP 502. For example, when the current memory access request is a store, bypass function 402 selects a value from the element in thresholds matrix 410 selected by the store column 512 and the row selector value in SBP 504. For example, when the current memory access request is a pre-fetch, bypass function 402 selects a value from the element in thresholds matrix 410 selected by the pre-fetch column 510 and the row selector value in PBP 506.

Bypass function 402 receives as input the three bypass parameters (LBP 502, SBP 504, and PBP 506), a threshold value obtained from thresholds matrix 410 as described above (depending on whether the current memory access is a load, store or pre-fetch), total evictions rate 404, dirty eviction rate 406, and eviction candidate state (ECS) 412 (indicating whether a cache line is clean or dirty, the cache line being that which would need to be displaced from M1 204 in order to make room for another cache line that is coming from M2 206). In one embodiment, bypass function 402 performs a computation or lookup to produce a binary decision represented as bypass indicator 524. In an embodiment, when bypass indicator 524 is set to 0, memory controller 124 displaces existing cache line Y 210 in M1 204 with cache line X 208, and when bypass indicator is set to 1, memory controller does not displace cache line Y 210 in M1 204. Instead, cache line x 208 is accessed from M2 206 by processor core 122 and/or cache 123.

In one embodiment, platform software (e.g., OS, hypervisor, management utilities) sets the values in thresholds matrix 410. In another embodiment, a runtime utility that has sufficient privileges (conferred by administrative controls) specifies the thresholds matrix. In general, platform software may specify default values and then utilities may be run at any time to alter the specified defaults, for example, to tune or optimize a computing platform for a particular mix of workloads or purposes for which the computing platform is being tailored—for example, a platform with a very large memory M2 in proportion with the size of memory M1 may be tailored for a conservative strategy for bypass, while a platform with adequate capacity in memory M1 may be tailored for a more permissive strategy (less bypassing).

In one embodiment, platform software (e.g., OS, hypervisor, management utilities) sets the values in thresholds matrix 410. In another embodiment, a runtime utility that has sufficient privileges (conferred by administrative controls) specifies the thresholds matrix. In general, platform software may specify default values and then utilities may be run at any time to alter the specified defaults, for example, to tune or optimize a computing platform for a particular mix of workloads or purposes for which the computing platform is being tailored—for example, a platform with a very large memory M2 in proportion with the size of memory M1 may be tailored for a conservative strategy for bypass, while a platform with adequate capacity in memory M1 may be tailored for a more permissive strategy (less bypassing).

FIGS. 6A, 6B, 6C, and 6D are diagrams of load, store, pre-fetch, and eviction scenarios according to some embodiments. The bypass decision, as indicated by bypass indicator 524, is used in the context of the various scenarios, which include (a) loads, (b) stores that don't overwrite a full cache line, (c) pre-fetches, and (d) evictions from the cache 123 (or cache bypassing stores from processor cores 122). In the first three cases, (a)-(c) the bypass function 402 guides decisions on whether or not missing cache lines will be allocated into M1 204, consonant with the goal of timely adaptation to the rate at which displacements happen, and precious write bandwidth into M2 206 which becomes stressed as a result when displacements cause the side-effect of driving up writebacks of modified cache lines that are displaced from M1 to M2. In this way, during execution of high priority applications, functions, microservices, etc., data can automatically get a higher likelihood of getting into M1, and also be protected from being squeezed out of M1 by lower priority applications, functions, etc., that come through later. (The thresholds are software thread specific). In case (d), a cache line/data going to from M1 to M2 is either not kept in M1 204 at all, or if the cache line is in M1, the cache line is either kept in a clean or dirty state, which draws a sophisticated balance between the competing needs of higher efficiency and better prioritization.

For the load case of FIG. 6A, at block 602 a load is being processed by processor core 122. At block 604, the load memory access request results in a miss at cache 123 and memory M1 204. Bypass function 402 computes bypass indicator 524 by using LBP 502, the threshold value 520 (for example) in column 514 selected by the LBP 502, the total evictions rate 404, the dirty eviction rate 405 and the eviction candidate state 412. When the bypass indicator 524 indicates a positive bypass decision (i.e., take the bypass), at block 606 the cache line is sent to processor core 122 and/or cache 123, without being cache in M1. When the bypass indicator 524 does not indicate bypass, at block 608 the cache line is copied into M1 204.

For the store case of FIG. 6B, at block 612 a store is being processed by processor core 122. At block 614, the store memory access request results in a miss at cache 123 and memory M1 204. Bypass function 402 computes bypass indicator 524 by using SBP 504, the threshold value 518 (for example) in column 512 selected by the SBP 504, the total evictions rate 404, the dirty eviction rate 405 and the eviction candidate state 412. When the bypass indicator 524 indicates a positive bypass decision, at block 616 the cache line is sent to processor core 122 and/or cache 123. When the bypass indicator does not indicate bypass, at block 618 the cache line is allocated into M1 204.

For the pre-fetch case of FIG. 6C, at block 622 a pre-fetch is being processed by processor core 122. At block 624, the pre-fetch memory access request results in a miss at cache 123 and memory M1 204. Bypass function 402 computes bypass indicator 524 by using PBP 506, the threshold value 516 (for example) in column 510 selected by the PBP 506, the total evictions rate 404, the dirty eviction rate 405 and the eviction candidate state 412. When the bypass indicator 524 indicates a positive bypass decision, at block 626 the cache line is sent to processor core 122 and/or cache 123. When the bypass indicator does not indicate bypass, at block 628 the cache line is copied into M1 204.

For the evictions case of FIG. 6D, if the cache line X being evicted from a processor cache 123 is being evicted due to a deadblock eviction, and the evicted cache line X is clean, then cache line X is neither cached in M1 204 nor updated into M2 206. If the cache line X being evicted from a processor cache 123 is being evicted due to a deadblock eviction, and the evicted cache line X is modified (i.e., dirty) then the cache line X is updated into M2 206, and is invalidated in M1 204 if the cache line X happens to be present in M1 204. If the cache line X being evicted from a processor cache 123 is clean, then it is not necessary to update cache line X in either M1 204 or M2 206, and therefore no further action is taken. Otherwise, the cache line X being evicted from a processor cache 123 is being evicted due to a normal, or non-deadblock eviction 632 and is modified, and is handled according to the following steps. Bypass indicator 524 is computed by the bypass function 402 according to a set of system-wide default LBP 502 and SBP 504 parameters that are not dependent on the plurality of the LBP and PBP parameters associated with the currently running threads on any of the plurality of processors in the computing system 100. If bypass indicator 524 indicates a positive bypass decision then the evicted cache line X is updated in M2, and, if a copy of the cache line X is found to be present in M1 204 at the address M1(X) in M1 204 then that copy is additionally updated and retained as a clean copy of X in M1 204. If bypass indicator 524 does not indicate a bypass, then the evicted cache line X is placed into M1 204 and marked as modified in M1 204; and will be updated in M2 206 when cache line X is eventually displaced from M1 204.

FIG. 6D describes handling evictions from process caches 123, and not about eviction candidates from out of memory M1. These processor cache evictions happen as unintended side effects from loads, stores, and prefetches that are produced by execution of software, but where the importance of retaining in memory M1 the cache lines that are being evicted from processor caches cannot be decided on the basis of what is executing, since the evictions are just a side effect. This is why the LBP/SBP/PBP parameters that are associated with an executing thread that causes load/store/prefetch cannot be used meaningfully in deciding about evictions. Therefore, a pair of default or non-thread-specific LBP/SBP parameters are used in determining a bypass decision.

In some embodiments, bypass parameters LBP 502, SBP 504, and PBP 506 are controlled by software. This may include software application 102, orchestration, scheduling, OS 106, utilities, or middleware. In other embodiments, the bypass parameters may be set up by a hardware-based control loop but overridden by software.

The three tables below show how the decision to displace cache lines in M1 204 in bypass function 402 works when the incoming cache line from M2 206 is due to a load, a store, or a prefetch. In each case, the goal is to provide a category of options ($L_a \ldots L_f, S_a \ldots S_f, P_a \ldots P_f$). In ascending order of subscripts (a→f) the options are designed to bias the bypass decision progressively towards reducing displacement and retaining the current data in M1 204, depending on the sensitivity or priority of the ongoing activity.

Access type: Load from some part of cache line X, bringing X from M2 206 because X is not in M1 204 or cache 123.

TABLE 1

| Load option | Behavior in M1 |
|---|---|
| $L_a$ | Normal: Unconditionally displace Y (X gets allocated and cached in M1) |
| $L_b$ | Displace Y if (clean(Y) or (total evictions rate < Threshold Matrix(eviction, $L_b$)) |
| $L_c$ | Displace Y if (clean(Y) or ((total evictions rate < Threshold Matrix(eviction, $L_c$) and (dirty eviction rate < Threshold Matrix(dirty-eviction, $L_c$))) |
| $L_d$ | Displace Y if (clean(Y)) |
| $L_e$ | Displace Y if (clean(Y) and (total evictions rate < Threshold Matrix(eviction, $L_e$)) |
| $L_f$ | Do not displace Y |

Access type: Store into some part of cache line X, bringing X from M2 206 because X is not in M1 204 or cache 123.

TABLE 2

| Store option | Behavior in M1 |
| --- | --- |
| $S_a$ | Normal: Unconditionally displace Y (X allocated in M1) |
| $S_b$ | Displace Y if (clean(Y) or (total evictions rate < Threshold Matrix(eviction, $S_b$)) |
| $S_c$ | Displace Y if (clean(Y) or ((total evictions rate < Threshold Matrix(eviction, $S_c$) and (dirty eviction rate < Threshold Matrix (dirty-eviction, $S_c$))) |
| $S_d$ | Displace Y if (clean(Y)) |
| $S_e$ | Displace Y if (clean(Y) and (total evictions rate < Threshold Matrix(eviction, $S_e$)) |
| $S_f$ | Do not displace Y |

Access type: Processor core 122 issues a prefetch for X, causing X to be fetched from M2 206.

TABLE 3

| Prefetches | Behavior in M1 |
| --- | --- |
| $P_a$ | Normal behavior for prefetches (may or may not displace Y from M1) |
| $P_b$ | Displace Y if (clean(Y) or (total evictions rate < Threshold Matrix(eviction, $P_b$)) |
| $P_c$ | Displace Y if (clean(Y) or ((total evictions rate < Threshold Matrix(eviction, $P_c$) and (dirty eviction rate < Threshold Matrix(dirty-eviction, $P_c$))) |
| $P_d$ | Displace Y if (clean(Y)) |
| $P_e$ | Displace Y if (clean(Y) and (total evictions rate < Threshold Matrix(eviction, $P_e$)) |
| $P_f$ | Do not displace Y |

Even though Table 3 contains six different rows for six different corresponding parameter settings $P_a, P_b, \ldots P_f$ it may be noted that prefetches are themselves speculative in nature, and therefore, in most cases, it does not help to differentiate among so many different categories of prefetches. Accordingly, as simplification, embodiments may employ fewer PBP parameter settings. In one example, it may be sufficient to use only four gradations of bypass decision by using only four PBP parameters, $P_a, P_b, P_e,$ and $P_f$. In particular, when total evictions rate 404 from M1 204 is small, it may suffice to keep the total evictions rate from growing too large by employing either $P_a$ or $P_b$ (applicable at lower total eviction rate thresholds), and otherwise—when the total evictions rate from M1 204 is high, a secondary goal may be to reduce the dirty eviction rate 406, which is accomplished by employing $P_e$ or $P_f$.

Embodiments of the present invention decide, when a cache line gets evicted, whether the cache line should be allocated in memory M1 204 (if not present), or invalidated from memory M1 (if present), or if the cache line is dirty, whether the cache line should be retained in clean mode, dirty mode, or not at all.

Figure 7:
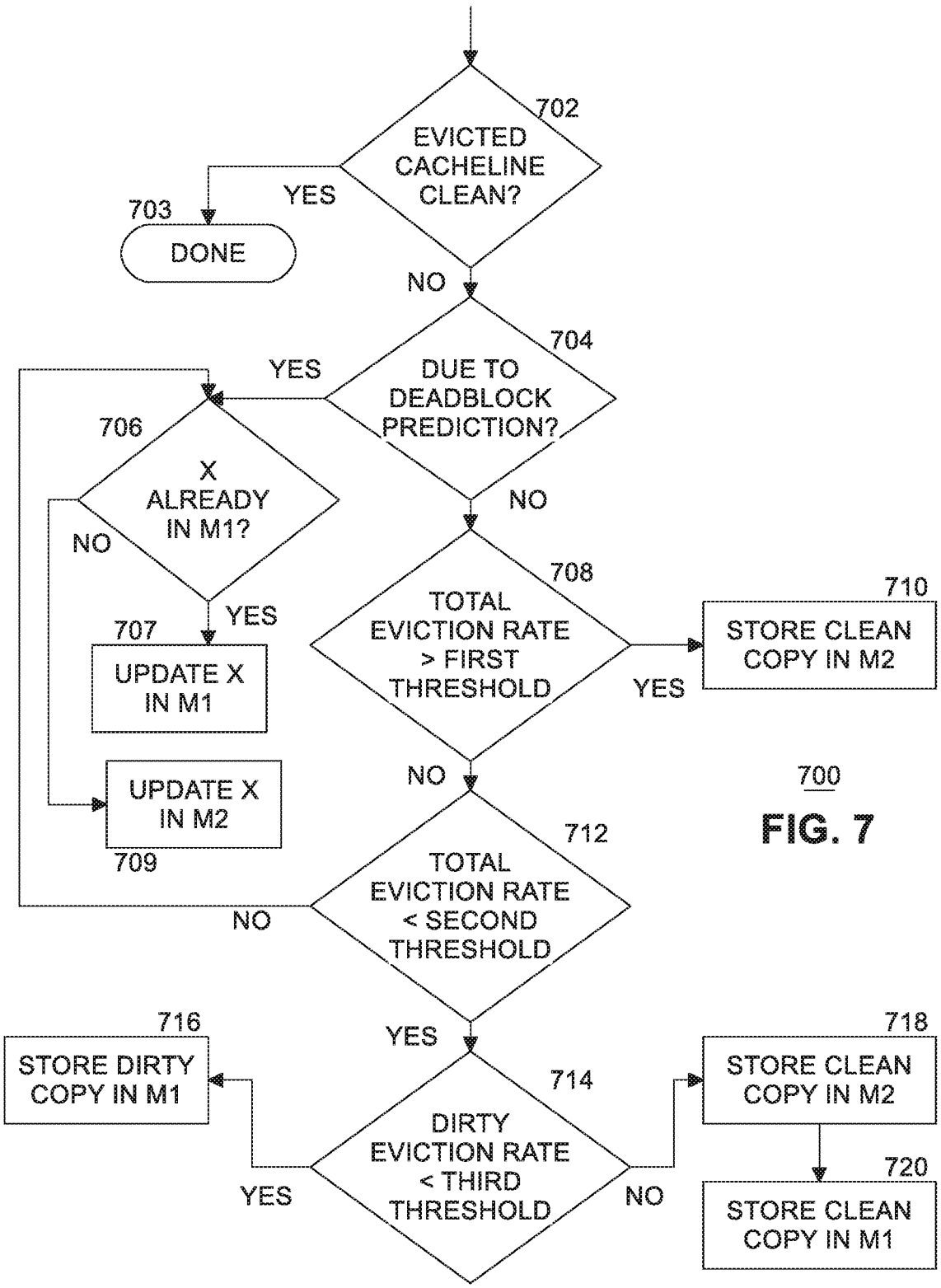
FIG. 7 is a flow diagram 700 of cache line displacement processing according to some embodiments.

FIG. 7 is a flow diagram 700 of cache line displacement processing for cache lines evicted from processor cache 123 according to some embodiments. In an embodiment, the processing of FIG. 7 is performed by memory controller 124. At block 702, if the evicted cache line (e.g., cache line X 208) is clean, then processing ends at done step 703. If the evicted cache line is not clean (e.g., dirty/modified), then at block 704 if the cache line X is indicated to be evicted due to a deadblock prediction, processing continues with block 706, where if the cache line X was already in M1, then update cache line X in M1 at block 707, else update cache line X in M2 at block 709. Processing ends after either block 707 or 709. Otherwise, processing continues with block 708, where if total eviction rate 404 is greater than a first threshold, the memory controller stores a clean copy of cache line X 208 in M2 206 at block 710 (the memory controller implicitly updates X in M1 if X is already in M1 at the time the eviction happened). Memory controller 124 also does not displace whatever cache line Y is in M1 204, if cache line Y 210 is different than cache line X 208 (at the time of the eviction of X). At block 712, if total eviction rate 404 is less than a second threshold, then processing continues with block 714. If not, the cache line X is updated in M2 a block 709 if cache line X is not present in M1 at block 706, and processing ends at block 703. As noted above, whenever a cache line X 208 is found in M1 at block 706, the cache line X is updated in M1 at block 707, independent of whether or not the cache line X is also updated in M2.

At block 714, if dirty eviction rate 406 is less than a third threshold, then store a dirty copy of cache line X 208 in M1 204 at block 716 (the memory controller implicitly updates cache line X in M1 if X is already in M1 at the time eviction happened, and the memory controller evicts any Y in M1, if Y is different than X, at the time of the eviction of X (e.g., X displaces Y)). If the dirty eviction rate is not less than the third threshold, then at block 718 the memory controller stores a clean copy of cache line X in M2 206. At block 720, the memory controller stores a clean copy of cache line X in M1 204 (the memory controller implicitly updates X in M1 if X is already in M1 at the time eviction happened, and the memory controller evicts any Yin M1, if Y is different than X, at the time of the eviction of X (e.g., X displaces Y)).

This flow may be represented as pseudocode as follows:
If the evicted cache line X from the cache is clean or is indicated to be evicted due to a deadblock prediction then do not retain cache line X in memory M1 unless cache line X was already in M1
else {// if the evicted cache line X from processor caches is dirty
    if the recent total eviction rate is above a first threshold
        then send the updated value of data in X directly into memory M2 and do not displace whatever cache line Y there is in memory M1, if cache line Y is different from X;
    if the recent total eviction rate is below a second threshold
        then send the updated value of data in X directly into memory M2 and retain the same updated value of data in X as a clean copy of X in memory M1;
    if both the recent total eviction rate is below the second threshold and the dirty eviction rate is below a third threshold then buffer the dirty cache line X in memory M1 as modified (i.e., propagate its updated value to M2 later)}

In the above processing, the following relations should hold. The first threshold should be set to a value greater than the second threshold, and the second threshold should be set to a value greater than the third threshold. If the above relations are violated (for example if a value of the second threshold is specified as greater than or equal to the first threshold, or if a value of the third threshold is specified as greater than the second threshold, then the memory controller can force a relationship wherein the first threshold divided by the second threshold is equal to the second threshold divided by the third threshold, and this is equal to a fourth threshold, where the fourth threshold is a specified default value that is larger than 1 (for example, the fourth threshold could be set as a default of 1.5).

These three thresholds are also set or updated by system software or performance management utilities, just as the thresholds matrix 410 is set and modified by system software or performance management software.

In the case of evictions, bypass function 402 implements the steps shown in FIG. 7. A positive decision to bypass results in the decisions shown at blocks 703, 710, and 706, while a decision not to bypass M1 for an eviction is reflected in the decision to either retain a clean copy of a modified cache line evicted from cache 123, at M1 in block 720 or to retain the cache line as a modified copy in M1 at block 716. For decisions as shown FIG. 7, bypass function 402 uses a system wide LBP parameter to select the first threshold used in decision block 708 and to select the second threshold used in decision block 712, and uses a system wide SBP parameter to select the third threshold used in block 714.

Figure 8:
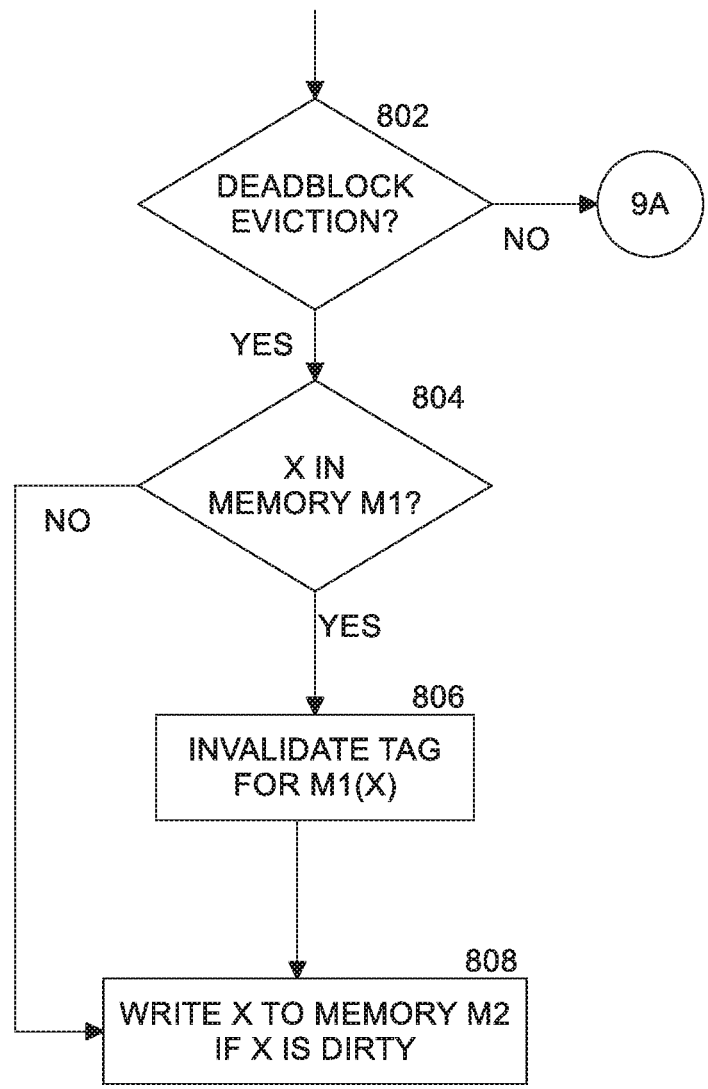
FIGS. 8 and 9 are flow diagrams of cache line displacement processing according to another embodiment.
Figure 9:
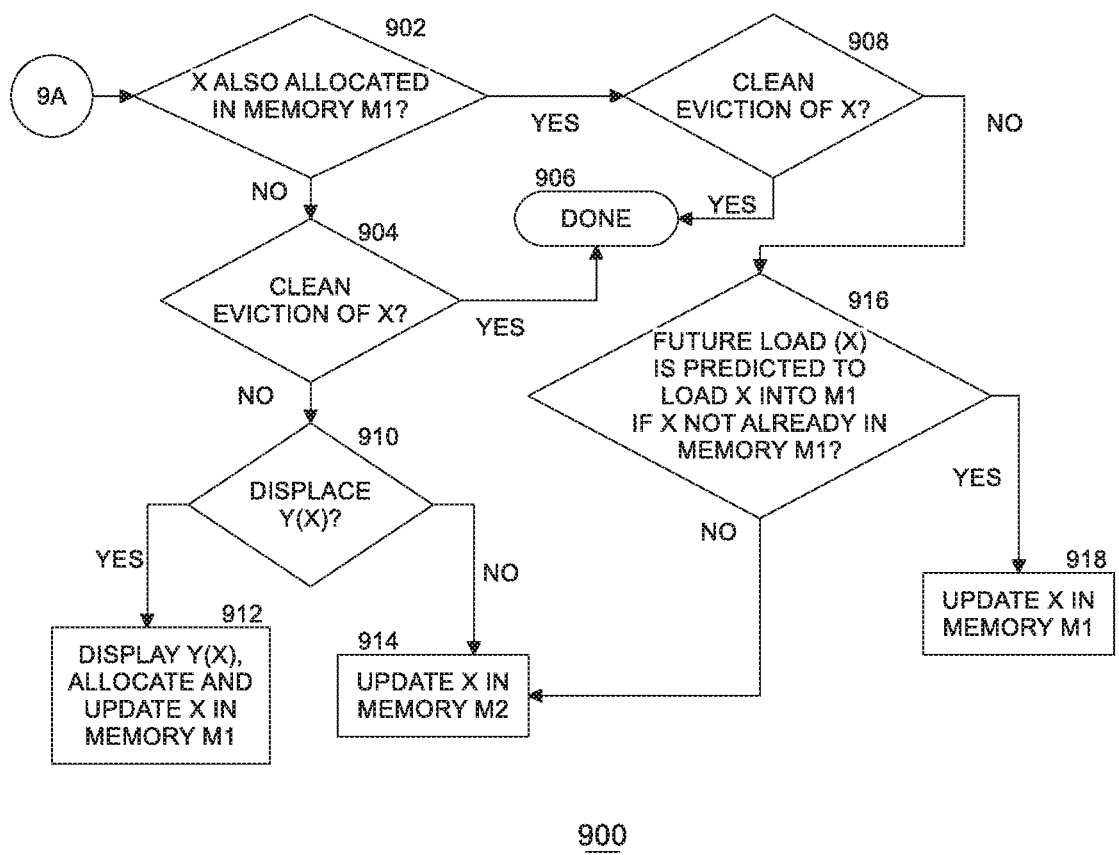

FIGS. 8 and 9 are flow diagrams of cache line displacement processing according to another embodiment. Let X 208 be an evicted cache line from the processor cache hierarchy 123. Consider that X may or may not be allocated in memory M1 204, and cache line X may or may not be clean at the time of eviction. Evictions are treated differently according to whether they are the result of a deadblock predictor, or ordinary evictions (e.g., usually capacity evictions). In the case of deadblock prediction, one approach is to free up capacity in M1 as well. If an eviction is not driven by deadblock prediction, then FIG. 9 describes the processing steps.

Cache line displacement processing by memory controller 124 begins at block 802, wherein if the eviction is due to a deadblock predictor, processing continues with block 804. Otherwise, processing continues at block 902 on FIG. 9. At block 804, if cache line X 208 is not currently in memory M1 204, then at block 808, memory controller 124 writes cache line X 208 to memory M2 206 if cache line X is dirty. If at block 804 the cache line X is currently in memory M1, then the memory controller invalidates the tag for M1(X), and processing continues with block 808.

At block 902 of FIG. 9, if cache line X 208 is also allocated in memory M1 204, processing continues to block 908, where if the eviction of cache line X is clean (e.g., X is clean), processing is complete at block 906. At block 902, if cache line X is not allocated in memory M1, then at block 904 if the eviction of cache line X is clean (e.g., X is clean), processing is complete at block 906. At block 904 if the eviction is not clean, then at block 910 memory controller 124 uses bypass function 402 to decide if cache line Y, which is at M1(X), is to be displaced. Y at M1(X) is represented herein as Y(X) for brevity. If the cache line Y(X) is to be displaced, then at block 912 the memory controller displaces cache line Y(X), and places the updated cache line X 208 in memory M1 204 released by displacing Y(X). If cache line Y(X) is not to be displaced at block 910, then at block 914 the memory controller updates cache line X 208 in memory M2 206.

Turning back to block 908, if the eviction of cache line X is not clean (e.g., dirty), then at block 916 the memory controller considers the following hypothetical. Suppose that at some time in the near future, the cache line X 208 were to be displaced from its berth M1(X) by some other cache line Y, where M1(Y)=M1(X). Now consider the likelihood that a subsequent future load (X) happens soon enough—that X re-enters M1 by displacing the cache line Y, assuming that the cache line Y has not been modified in the short interim duration between when Y displaced X in M1 and when X is about to displace Y. In decision block 916, the memory controller evaluates whether the displacement rates are running high enough that it is likely that the cache line X will be displaced by Y and Y in turn displaced by X so soon that it is advantageous to retain X only as a clean copy in M1. That is, is the future load (X) predicted to load X into M1 if X is not already in memory M1? If so, processing goes to block 912. If not, processing goes to block 914.

In another embodiment, a performance monitoring unit (PMU) of circuitry 120 may be extended to provide approximate event or time based sampling for the total evictions rate and for the dirty eviction rates, so that the memory controller does not have to be burdened with these metrics; further, these rates, collected by the PMU, can be used for software optimization in any case—such as to improve algorithms so that a cache footprint can be improved. In addition, embodiments of the present invention generate useful statistics that can be analyzed to achieve better settings of the bypass parameters (LBP 502, SBP 504, PBP 506) and for thresholds matrix 410.

Embodiments of the present invention leverage the intuition that when data is touched/modified from high priority or hot code paths, that this should translate into a bias for keeping the data in a higher performance memory 111. Code-side is generally easily profiled by capturing instruction addresses and their associated behaviors in processors (with PMU counters). A very rich set of optimization methodologies, and supporting tool chains already exists for the code-behavior. Embodiments bridge the code-side techniques over to data-side, on the intuition that reducing cycles per instruction (CPI) is a priority, or boosting priority of a given interval of code, then the data touched from that code is also given priority in memory M1.

Embodiments deviate from generic 2LM approaches because embodiments resist eviction for data that is in memory M1 under some conditions that can be determined at run time based on both software guidance that is operative at run time, and, the clean-eviction rate and the dirty-eviction rate at run time. But embodiments do not require an extra state to mark a cache line in memory M1 as deserving to be retained because embodiments determine the bias against eviction according to criteria that are derived, just-in-time, on the basis of (1) current memory M eviction rate telemetry—both for clean and modified lines, and (2) permissible memory M1 eviction thresholds that reflect the sensitivity or importance of the activity that is triggering an eviction at a given instant. Thus, the same code may evict a particular incumbent cache line at one time, but fail to do so at a second time, if the dynamic conditions vary; while, at the same time and under the same dynamic condition, one activity may succeed in evicting a particular incumbent cache line but the other one may not; all without requiring any tagging of the incumbent cache line.

Embodiments deviate from AD because embodiments do not put the burden of deciding which virtual pages should be in memory M1 and which ones in memory M2 upon software developers; instead, embodiments acknowledge that software developers have some idea (or can build-in feedback mechanisms) to indicate which data is important; such ideas translate, in embodiments, into modulating the thresholds for eviction. However, unlike AD, embodiments do not restrict displacement from memory M1 on a statistical basis if a particular data cache line has stopped being accessed for an extended duration of time, because it is improbable that the eviction rate remains uniformly high for all possible eviction decision thresholds. Further, embodiments do not tie up a whole page just because one or two of the page's cache lines should be resisting eviction.

Embodiments are orthogonal to other conflict-reduction initiatives which may be employed in memory M1, For example, if two hash functions F1 and F2 are introduced to map memory M2 into memory M1 (with, say F2 being applied after F1 produces a miss), then embodiments may be naturally generalized to decide whether the victim should be from F1, F2, or neither, and whether the displacer gets F1 or F2 mapping. Embodiments can be generalized to more than two memory tiers and may be applicable to other processor-memory interconnects, or DIMM media technologies, etc.

Embodiments apply different criteria for deciding whether to evict a cache line from memory M1 according to whether the potential successor is a result of a load, store, or prefetch access. Embodiments also propose to condition, when data is evicted from processor caches, whether such data should be (a) clean-retained, (b) dirty-retained, or (c) not-retained in memory M1; and, in this decision, embodiments consider whether such data was evicted due to dead-block prediction (assuming the caching agents furnish such information).

Figure 10:
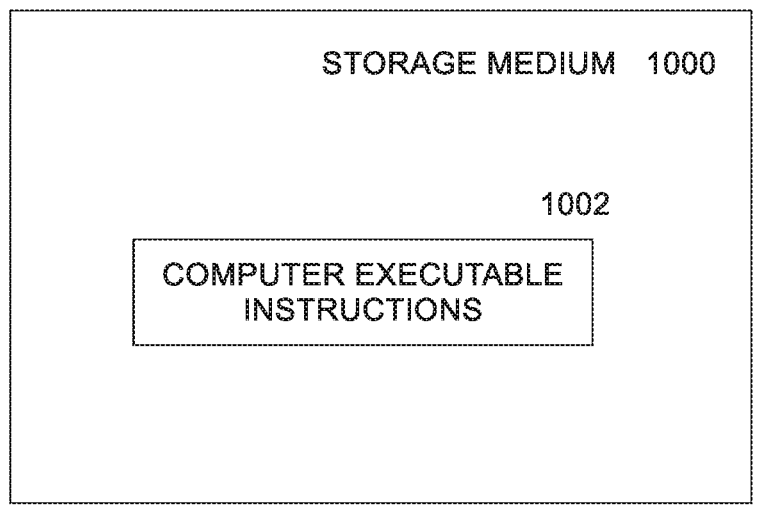
FIG. 10 illustrates an example of a storage medium.

FIG. 10 illustrates an example of a tangible storage medium 1200. Storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions 1202 to implement logic flows described above. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
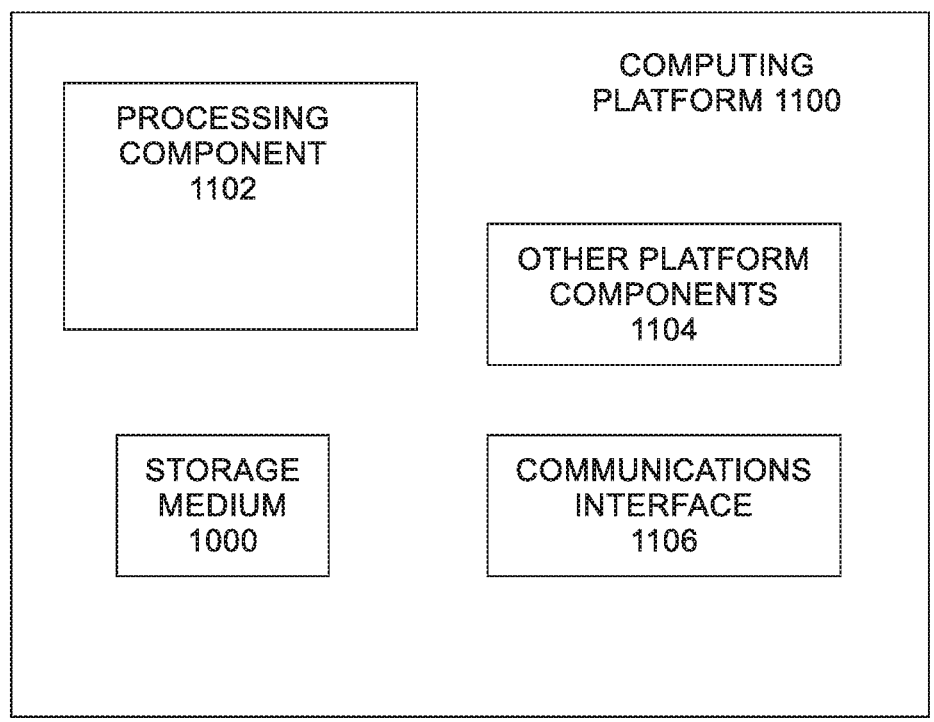
FIG. 11 illustrates an example computing platform.

FIG. 11 illustrates an example computing platform 1100. In some examples, as shown in FIG. 11, computing platform 1100 may include a processing component 1102, other platform components 1104 and/or a communications interface 1106.

According to some examples, processing component 1102 may execute processing operations or logic for instructions stored on storage medium 1000. Processing component 1102 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1104 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1106 may include logic and/or features to support a communication interface. For these examples, communications interface 1106 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1100, including logic represented by the instructions stored on storage medium 1000 may be implemented using any combination of discrete circuitry, ASICs, logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   at least one processor core circuitry to execute instructions of a program;
   a cache; and
   memory controller circuitry including
   a plurality of bypass parameters set by the program, the plurality of bypass parameters including at least a load bypass parameter (LBP), a store bypass parameter (SBP), and a pre-fetch bypass parameter (PBP);
   a thresholds matrix to store threshold values selectable by the plurality of bypass parameters; and a bypass function to determine whether a first cache line is to be displaced with a second cache line in a first memory or the first cache line remains in the first memory and the second cache line is to be accessed by at least one of the processor core circuitry and the cache from a second memory.

2. The apparatus of claim 1, wherein the first memory has a performance capability higher than the second memory and the first memory is nearer to the at least one processor core circuitry than the second memory.

3. The apparatus of claim 2, wherein the first memory comprises a dynamic random-access memory (DRAM) and the second memory comprises a byte addressable non-volatile memory (NVM).

4. The apparatus of claim 3, wherein the byte addressable NVM comprises a three-dimensional cross point memory.

5. The apparatus of claim 1, wherein the plurality of bypass parameters is set for a software thread being executed by the at least one processor core.

6. The apparatus of claim 1, wherein the bypass function uses the LBP to select a threshold value from the threshold matrix when an instruction executed by the at least one processor core accessing the second cache line is a load instruction, the SBP to select the threshold value from the threshold matrix when an instruction executed by the at least one processor core accessing the second cache line is a store instruction, and the PBP to select the threshold value from the threshold matrix when an instruction executed by the at least one processor core accessing the second cache line is a pre-fetch instruction.

7. The apparatus of claim 1, wherein the memory controller circuitry comprises a state indicating whether the first cache line is clean or dirty, and the bypass function uses the state, a total evictions rate, a dirty eviction rate, a selected one of the bypass parameters, and a threshold value from the thresholds matrix selected by the selected one of the bypass parameters to determine whether the first cache line is displaced with the second cache line in the first memory or the first cache line remains in the first memory and the second cache line is to be accessed by at least one of the processor core circuitry and the cache from the second memory.

8. The apparatus of claim 7, wherein the total evictions rate comprises a rate at which cache lines are displaced from the first memory.

9. The apparatus of claim 8, wherein the dirty eviction rate comprises a portion of the total evictions rate that requires displaced cache lines to be written back into the second memory.

10. A computer system comprising:
a first memory;
a second memory;
at least one processor core circuitry to execute instructions of a program;
a cache; and
memory controller circuitry including
a plurality of bypass parameters set by the program, the plurality of bypass parameters including at least a load bypass parameter (LBP), a store bypass parameter (SBP), and a pre-fetch bypass parameter (PBP);
a thresholds matrix to store threshold values selectable by the plurality of bypass parameters; and
a bypass function to determine whether a first cache line is to be displaced with a second cache line in the first memory or the first cache line remains in the first memory and the second cache line is to be accessed by at least one of the processor core circuitry and the cache from the second memory.

11. The computer system of claim 10, wherein the first memory has a performance capability higher than the second memory and the first memory is nearer to the at least one processor core circuitry than the second memory.

12. The computer system of claim 11, wherein the first memory comprises a dynamic random-access memory (DRAM) and the second memory comprises a byte addressable non-volatile memory (NVM).

13. The computer system of claim 12, wherein the byte addressable NVM comprises a three-dimensional cross point memory.

14. The computer system of claim 10, wherein the plurality of bypass parameters is set for a software thread being executed by the at least one processor core.

15. The computer system of claim 10, wherein the bypass function uses the LBP to select a threshold value from the threshold matrix when an instruction executed by the at least one processor core accessing the second cache line is a load instruction, the SBP to select the threshold value from the threshold matrix when an instruction executed by the at least one processor core accessing the second cache line is a store instruction, and the PBP to select the threshold value from the threshold matrix when an instruction executed by the at least one processor core accessing the second cache line is a pre-fetch instruction.

16. The computer system of claim 10, wherein the memory controller circuitry comprises a state indicating whether the first cache line is clean or dirty, and the bypass function uses the state, a total evictions rate, a dirty eviction rate, a selected one of the bypass parameters, and a threshold value from the thresholds matrix selected by the selected one of the bypass parameters to determine whether the first cache line is displaced with the second cache line in the first memory or the first cache line remains in the first memory and the second cache line is to be accessed by at least one of the processor core circuitry and the cache from the second memory.

17. The computer system of claim 16, wherein the total evictions rate comprises a rate at which cache lines are displaced from the first memory.

18. The computer system of claim 17, wherein the dirty eviction rate comprises a portion of the total evictions rate that requires displaced cache lines to be written back into the second memory.

19. A method comprising:
receiving, by memory controller circuitry, a plurality of bypass parameters from a program being executed by a processor core, the plurality of bypass parameters including at least a load bypass parameter (LBP), a store bypass parameter (SBP), and a pre-fetch bypass parameter (PBP);
determining a total evictions rate;
determining a dirty eviction rate;
determining a state of whether a second cache line is clean or dirty;
selecting a threshold value from a thresholds matrix based at least in part on a selected one of the bypass parameters; and
determining whether a first cache line is to be displaced with the second cache line in a first memory or the first cache line remains in the first memory and the second cache line is to be accessed by at least one of the processor core and the cache from a second memory.

20. The method of claim 19, wherein the plurality of bypass parameters is set for a software thread being executed by the processor core.

21. The method of claim 19, comprising using the LBP to select the threshold value from the threshold matrix when an instruction executed by the processor core accessing the second cache line is a load instruction, the SBP to select the threshold value from the threshold matrix when an instruction executed by the processor core accessing the second cache line is a store instruction, and the PBP to select the threshold value from the threshold matrix when an instruction executed by the processor core accessing the second cache line is a pre-fetch instruction.

22. The method of claim 19, comprising using a state indicating whether the first cache line is clean or dirty, and using the state, the total evictions rate, the dirty eviction rate, the selected one of the bypass parameters, and the threshold value from the thresholds matrix selected by the selected one of the bypass parameters to determine whether the first cache line is displaced with the second cache line in the first memory or the first cache line remains in the first memory and the second cache line is to be accessed by at least one of the processor core and the cache from the second memory.

23. The method of claim 22, wherein the total evictions rate comprises a rate at which cache lines are displaced from the first memory.

24. The method of claim 23, wherein the dirty eviction rate comprises a portion of the total evictions rate that requires displaced cache lines to be written back into the second memory.

* * * * *